United States Patent [19]

Nishizawa

[11] Patent Number: 5,415,892

[45] Date of Patent: May 16, 1995

[54] METHOD OF IMPREGNATING A WINDING ASSEMBLY OF AN ELECTRICAL EQUIPMENT WITH VARNISH

[75] Inventor: Hiroshi Nishizawa, Mie, Japan

[73] Assignee: Kabushiki Kaisha Toshiba, Kanagawa, Japan

[21] Appl. No.: 871,824

[22] Filed: Apr. 21, 1992

[51] Int. Cl.$^6$ .................. B05D 1/32; B05D 3/02; B05D 7/22; B05D 7/20

[52] U.S. Cl. .................. 427/295; 427/294; 427/296; 427/369; 427/370; 427/435; 427/116

[58] Field of Search ............... 427/294, 295, 296, 369, 427/370, 435, 116

[56] References Cited

U.S. PATENT DOCUMENTS

| | | | |
|---|---|---|---|
| 3,904,785 | 9/1975 | Baumann | 427/435 X |
| 3,937,855 | 2/1976 | Gruenwald | 427/294 X |
| 3,991,232 | 11/1976 | Kamiuchi et al. | 427/295 X |
| 4,222,802 | 9/1980 | Sakai et al. | 427/435 X |

FOREIGN PATENT DOCUMENTS 55-23017  6/1980  Japan .
62-152352 7/1987  Japan .

*Primary Examiner*—Paul Lieberman
*Assistant Examiner*—Douglas J. McGinty
*Attorney, Agent, or Firm*—Limbach & Limbach

[57] ABSTRACT

A method of impregnating a winding assembly of an electrical equipment with varnish, the winding assembly including a core and one or more windings wound on the core, the method comprising steps of enclosing the winding assembly in a bag, pouring a predetermined amount of varnish into the bag enclosing the winding assembly, reducing an atmospheric pressure in the bag and thereafter, maintaining the bag in the air-tightly closed state so that the winding of the winding assembly is impregnated with the varnish poured into the bag, and drying the winding assembly after completion of the step of impregnating the winding with the varnish.

13 Claims, 6 Drawing Sheets

METHOD OF IMPREGNATING A WINDING ASSEMBLY OF AN ELECTRICAL EQUIPMENT WITH VARNISH

BACKGROUND OF THE INVENTION

This invention relates to a method of impregnating a winding assembly such as a stator of a dynamoelectric machine with varnish and thereafter, drying the winding assembly impregnated with the varnish.

A winding assembly comprising a stator core and one or a plurality of windings wound on the stator core, for example, is impregnated with varnish in electrical equipments such as rotating machines, thereby improving an electrically insulating property, a heat proof and mechanical durability of the winding assembly such as a mechanical deformation. In a general method of impregnating the winding assembly with the varnish in the prior art, the winding assembly is impregnated with the varnish reserved in a vessel so that the varnish is sufficiently permeated into the inside of the winding. Subsequently, the winding assembly is pulled out of the vessel and a superfluous amount of the varnish is removed from the winding assembly by self-dropping. The winding assembly is then put into a heating furnace for a drying process.

In accordance with the above-described conventional method, however, it is difficult to permeate the varnish among strands of the windings and between the windings and inner peripheral faces of core slots in each of which the windings are embedded. Furthermore, an excessive amount of the varnish is removed from the winding assembly when it is pulled out of the vessel. As a result, vacant spaces are left in the windings and between the windings and the inner peripheral faces of the core slots, resulting in problems of reduction in the insulating property and the mechanical strength of the winding assembly.

To prevent the above-described left vacant spaces, the prior art has provided another method wherein the winding assembly is accommodated in a tank and thereafter, an atmospheric pressure in the tank is reduced. The varnish is caused to drop onto the winding assembly in the condition that the atmospheric pressure in the tank has been reduced, thereby impregnating the winding assembly with the varnish.

However, even in the above-described method wherein the impregnation is performed in the vacuum vessel, an excessive amount of the varnish permeated into the winding assembly flows out of it in the drying step for hardening the varnish after the impregnation, thus resulting in the vacant spaces in the winding assembly.

SUMMARY OF THE INVENTION

Therefore, an object of the present invention is to provide an improved method of impregnating the winding assembly of the electrical equipment with varnish, in which method the winding assembly can be readily impregnated with the varnish sufficiently into the depth thereof.

Another object of the invention is to provide an improved method of impregnating the winding assembly of the electrical equipment with varnish, in which method an excessive amount of the varnish can be prevented from being removed from the winding assembly after the impregnating step.

In one aspect, the present invention provides a method of impregnating a winding assembly of an electrical equipment with varnish, the winding assembly including a core and one or more windings wound on the core, the method comprising steps of enclosing the winding assembly in a bag, pouring a predetermined amount of varnish into the bag enclosing the winding assembly, reducing an atmospheric pressure in the bag and thereafter, maintaining the bag in the air-tightly closed state so that the winding of the winding assembly is impregnated with the varnish poured into the bag, and drying the winding assembly after completion of the step of impregnating the winding with the varnish.

In another aspect of the invention, the step of pouring the varnish into the bag is performed after the step of reducing the atmospheric pressure in the bag enclosing the winding assembly and maintaining the bag in the air-tightly closed state.

In accordance with the present invention, impregnating the winding assembly with the varnish is performed in the air-tightly closed bag in the condition that the atmospheric pressure in the bag has been reduced. The winding assembly can be readily impregnated with the varnish sufficiently into the depth thereof and the outflow of an excessive amount of the varnish can be prevented by the bag. Consequently, the vacant spaces, which are undesirable for maintenance of the insulating property and the mechanical strength of the winding assembly, can be prevented from being left in the winding assembly after completion of the drying step.

Other objects of the present invention will become obvious upon understanding of the illustrative embodiments about to be described. Various advantages not referred to herein will occur to one skilled in the art upon employment of the invention in practice.

BRIEF DESCRIPTION OF THE DRAWINGS

Several embodiments will be described with reference to the accompanying drawings in which.

DESCRIPTION OF THE PREFERRED EMBODIMENTS

Figure 1:
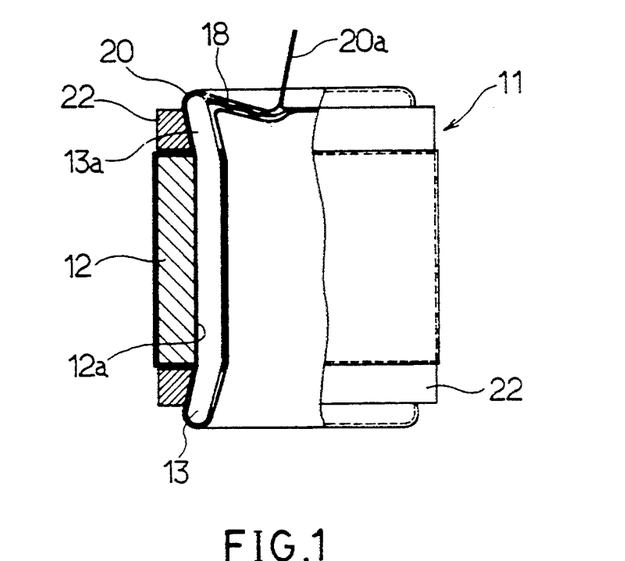
FIG. 1 is a partially longitudinally sectional front view of a winding assembly enclosed in a bag in the condition that an atmospheric pressure in the bag has been reduced, in accordance with a first embodiment of the present invention.
Figure 2:
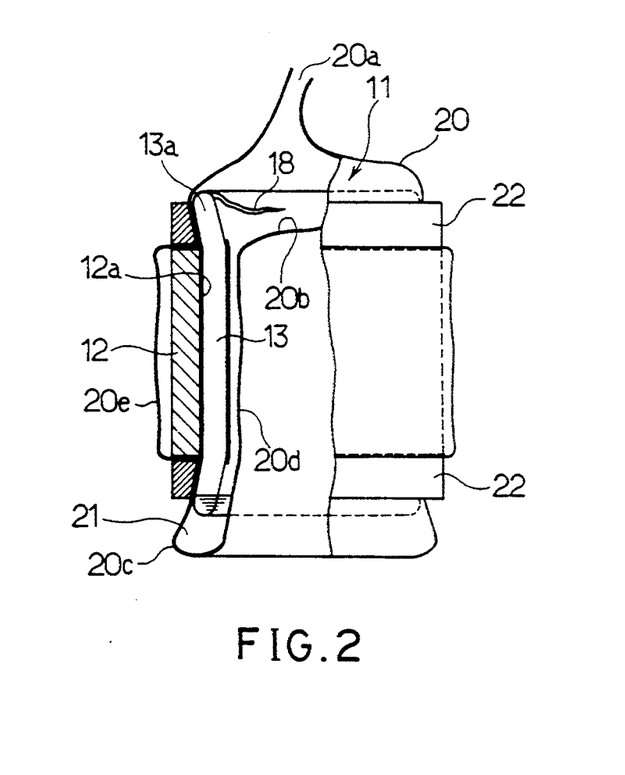
FIG. 2 is also a partially longitudinally sectional front view of the winding assembly enclosed in the bag before the atmospheric pressure in the bag is reduced.
Figure 4:
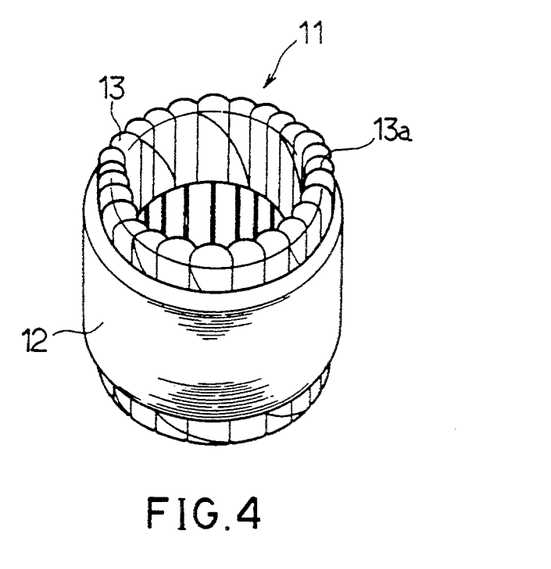
FIG. 4 is a perspective view of a stator to which the invention is applied.
Figure 5:
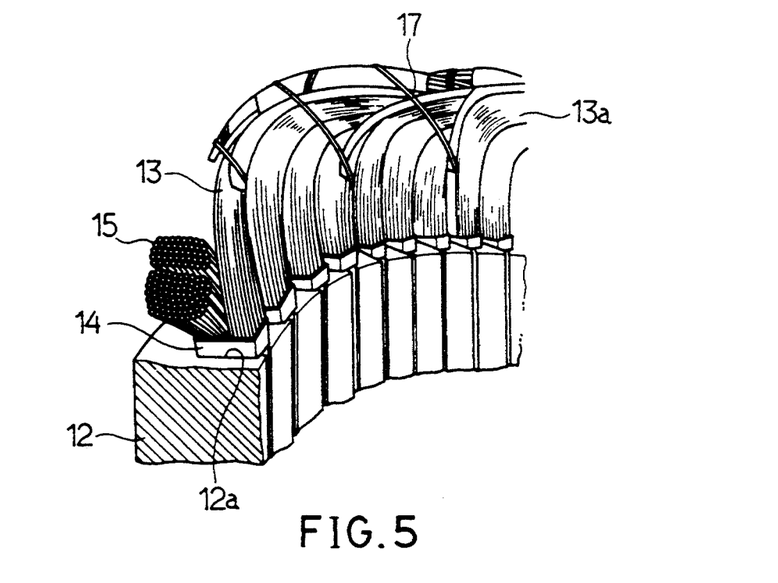
FIG. 5 is an enlarged perspective view of a coil end of the stator.
Figure 6:
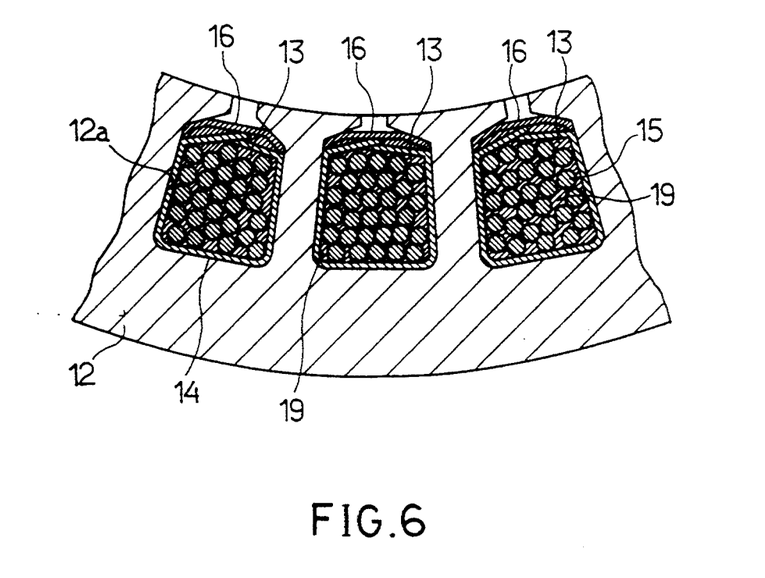
FIG. 6 is a partially enlarged transversely sectional view of the stator.

A first embodiment wherein a stator of a dynamoelectric machine is impregnated with varnish will be described with reference to FIGS. 1 through 6. Referring first to FIGS. 4–6, the stator 11 of the dynamoelectric machine is illustrated. The stator 11 comprises a stator core 12 and a plurality of windings 13 wound on the stator core 12 and is formed into a generally cylindrical shape. The stator core 12 is formed by laminating a plurality of thin steel sheets into the cylindrical shape. Each steel sheet has a plurality of open slots 12a formed in the inner circumference thereof. Electrical insulators are provided in the respective slots 12a. Each winding 13 is formed by winding strands such as enameled wires 15. Such windings 13 are embedded in the respective slots 12a and then fixed in position by respective wedges 16 such that the windings 13 are wound on the stator core 12. Coil ends 13 projecting from the slots 12a are shaped by binding threads 17 respectively. Connection among the windings 13 are made at the coil ends 13a and lead wires 18 extend from the coil ends 13a, as shown in FIGS. 1 and 2.

The winding assembly or the stator 11 constructed as described above is to be impregnated with varnish as will be described in detail such that insulating varnish layers 19 are formed between the strands 15 of the windings 13 and between the windings 13 and the inner faces of the respective slots 12a or insulators 14. As a result, heat proof, vibration proof and insulating property of the windings 13 are improved and fixation of the windings 13 to the stator core 12 is secured.

Figure 3:
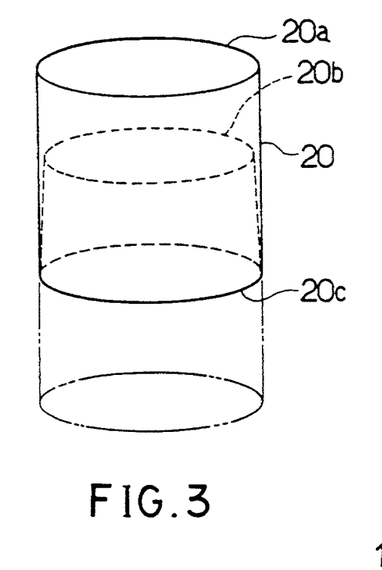
FIG. 3 is a schematically diagrammatic view of the bag for explaining a manner of folding the bag shown in FIG. 2.

A procedure for impregnating the stator core 12 and the windings 13 with varnish will now be described with further reference to FIGS. 1–3. The windings 13 are wound on the stator core 12 into a winding assembly as described above. First, the winding assembly is enclosed in a bag 20 having a size sufficient to cover the winding assembly entirely as shown in FIG. 3. The bag 20 has an open end 20a and a closed end 20b. The bag 20 is formed from an impermeable flexible plastic film such as polyethylene or nylon such that it has a double bag structure in which an outer bag is formed from nylon and an inner bag is formed from polyethylene, though the bag is shown in the state of a single bag in the figures. After the stator 11 is enclosed in the bag 20, the bag 20 is folded at the middle portion thereof by upwardly passing the lower closed end 20b through the inner side of the stator 11 to the open end 20a side, as is shown in FIGS. 2, 3. As a result, inner and outer cylindrical portions 20d and 20e are formed in the bag 20 and the stator 11 is covered by the inner and outer cylindrical portions 20d, 20e from the inner and outer sides respectively. In this state, a predetermined amount of a solventless varnish 21, for example, is poured into the bag 20 enclosing the stator 11 and then, a ring lapping member 22 formed from an elastic material such as urethane foam is fitted with outer peripheral portions of the coil ends, as shown in FIG. 2. Provision of the lapping member 22 causes the bag 20 to closely adhere to the stator core 12 and the coil ends 13a along their outer peripheral configurations, thereby preventing the floating of the coil end strands and their slippage or displacement relative to the stator 11.

Subsequently, the open end 20a of the bag 20 is connected to a pressure reducing device (not shown) so that a vacuum is made in the bag 20. An atmospheric pressure in the bag 20 is thus reduced such that the bag 20 is further caused to adhere to the stator 11 along its inner and outer peripheral configurations as if the stator 11 were vacuum packaged in the bag 20, as shown in FIG. 1. In this state, the open end 20a is heat sealed and the bag 20 is then disconnected from the pressure reducing device. The stator core 12 and the windings 13 are gradually impregnated with the varnish 21 in the bag 20 when the bag 20 has closely adhered to the inner and outer peripheral faces of the stator 11. Since the atmospheric pressure in the bag 20 has been reduced, the varnish 21 penetrates into spaces between the strands 15 of the windings 13 and into the depth of a narrow space between the windings 13 and the inner face of each slot 12a readily and reliably. Thereafter, the procedure is transferred from the impregnating step to a drying step wherein the stator 11 enclosed in the bag 20 is heated so that the varnish 21 having penetrated into the stator 11 is hardened. In the drying step, the drying of the stator 11 is initiated and then, the stator 11 is removed from the bag 20 and the wrap members 22 when the varnish is gelatinized from the liquid state. Thereafter, the drying is continued in this condition. As a result, the insulating varnish layers 19 are formed in the stator 11.

In accordance with the above-described embodiment, the stator 11 can be impregnated with the varnish 21 such that the varnish 21 penetrates into the spaces between the strands 15 of the windings 13 and into the depth of the narrow space between the windings 13 and the inner face of each slot 12a readily and reliably. Furthermore, the varnish 21 having penetrated in the stator 11 can be prevented from flowing out since the procedure is transferred from the impregnating step to the drying step for hardening the varnish 21 in the condition that the stator 11 is enclosed in the bag 20. Accordingly, the vacant spaces due to the outflow of the varnish are not left between the windings and each slot, which can improve the heat proof, vibration proof and insulating property of the windings 13 and which can secure the fixation of the windings 13 to the stator core 12.

In the embodiment, particularly, the open end 20a of the bag 20 is connected to the pressure reducing device so that the atmospheric pressure in the bag 20 is reduced. Accordingly, a large-scaled apparatus such as a vacuum vessel required in the conventional method is not necessitated, resulting in the simplified and cost-effective apparatus.

Figure 7:
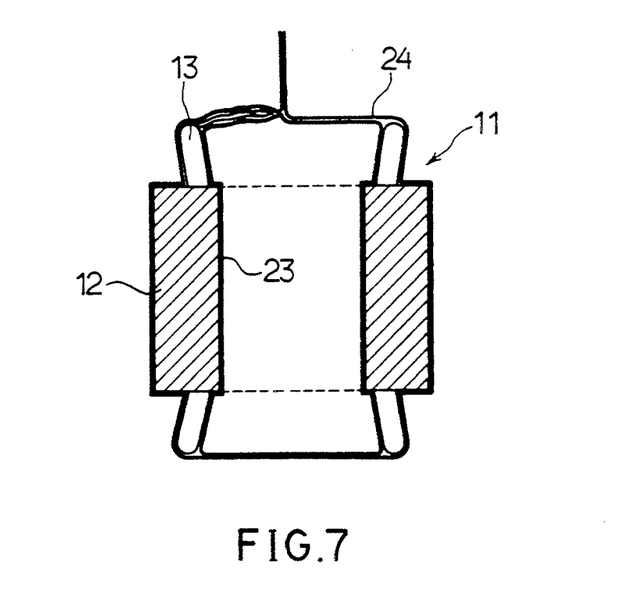
FIG. 7 is a longitudinally sectional front view of the bag enclosing the winding assembly in the condition that the atmospheric pressure in the bag has been reduced, in accordance with a second embodiment of the invention.

Although the lower portion of the bag 20 is folded so that the bag 20 closely adheres to the inner and outer peripheral faces of the stator 11 in the foregoing embodiment, a balloon-like barrier 23 formed of a flexible impermeable material such as rubber may be provided so as to be brought into close contact with the inner circumferential face of the stator 11, instead, as shown as a second embodiment in FIG. 7. The stator 11 with the barrier 23 in close contact therewith is enclosed in a bag 24. The pressure in the bag 24 is reduced so that the stator 11 is impregnated with the varnish.

Although the bag has a double bag structure in the foregoing embodiments, it may have a single bag structure.

Figure 8:
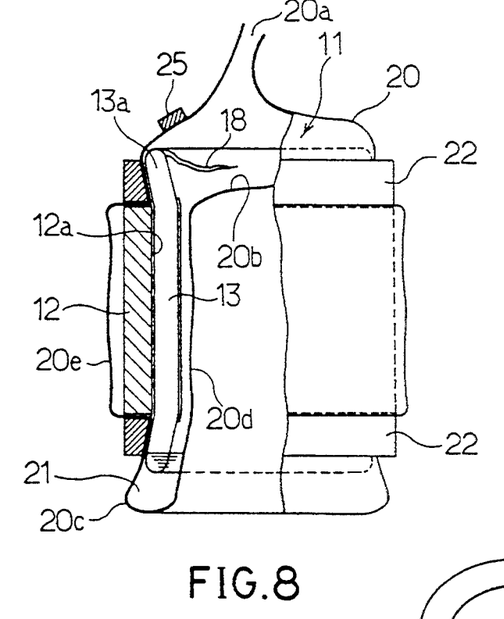
FIG. 8 is a view similar to FIG. 2 showing a third embodiment of the invention.

FIG. 8 illustrates a third embodiment of the invention. An air-tightly closing member 25 is previously attached to the bag 20 for injecting the varnish into the bag 20. The air-tightly closing member 25 is formed of an elastic material such as rubber. The stator 11 is enclosed in the bag 20 and thereafter, its open end 20a is heat sealed so that the bag 20 is air-tightly closed. In this state, an injection needle (not shown) serving as a varnish injecting jig is air-tightly penetrated through the air-tightly closing member 25 so that the varnish is injected through the injection needle into the bag 20. The air-tightly closing member 25 can be air-tightly closed by its elastic deformation both when the injection needle has been penetrated through the air-tightly closing member 25 and when the injection needle has been pulled out of the air-tightly closing member 25.

Figure 9:
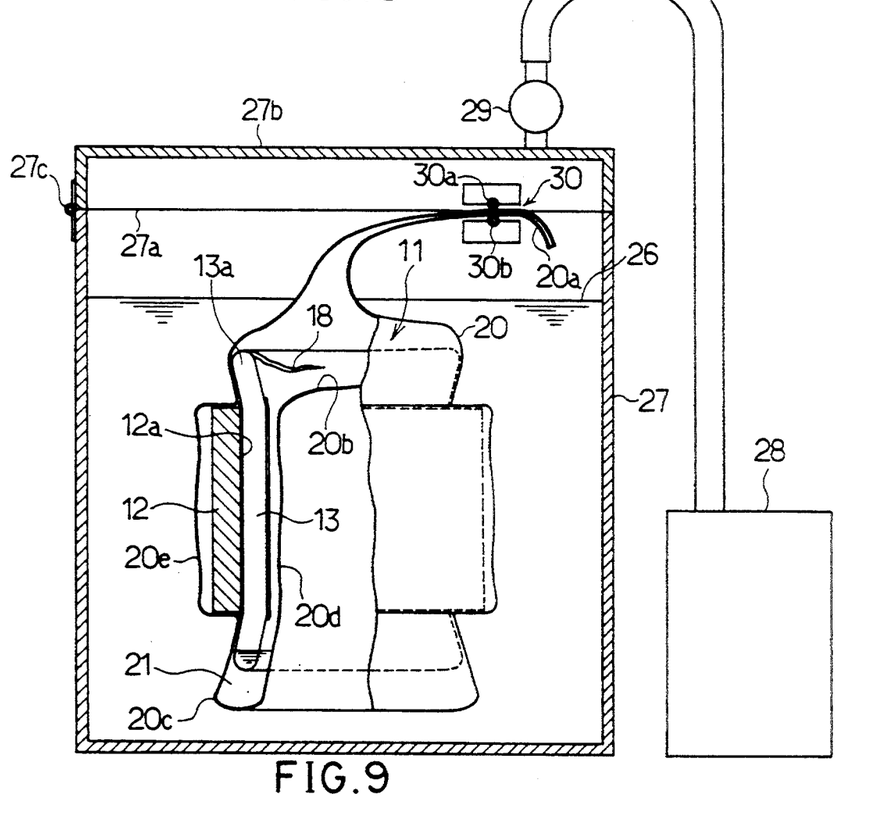
FIG. 9 is a schematic longitudinally sectional view of an oil-filled tank accommodating the bag enclosing the stator, in accordance with a fourth embodiment of the invention.

FIG. 9 illustrates a fourth embodiment. The stator 11 is enclosed in the bag 20 in the manner as described above with reference to FIG. 2. A tank 27 reserves therein a predetermined amount of insulating oil 26 heated to a predetermined temperature, for example, 100° C. The bag 20 enclosing the stator 11 is accommodated in the tank 27 such that the bag 20 is entirely soaked in the insulating oil 26. The binding members 22 as shown in FIG. 2 are not necessary in the fourth embodiment. In the condition that the bag 20 enclosing the stator 11 has been entirely soaked in the insulating oil 26, an upper opening 27a of the tank 27 is closed by a lid 27b mounted on a hinge 27c. The lid 27b is provided with a heat sealer 30 and an intake valve 29 communicating with the pressure reducing device 28. The tank 27 is evacuated in the condition that its upper opening 27a is air-tightly closed by the lid 27b. The open end 20a of the bag 20 is sealed by a heat sealer 30 when the bag 20 has adhered to the inner and outer circumferential faces of the stator 11 as the result of evacuation. The bag 20 is then left in the close adherence to the inner and outer circumferential faces of the stator 11 for a predetermined period of time. In this condition, the bag 20 is subjected to the pressure of the insulating oil 26 and is further caused to closely adhere to the inner and outer circumferential faces of the stator 11. Furthermore, the stator 11 is subjected to heat generated by the insulating oil 26 to be heated, thereby executing the drying step.

Figure 10:
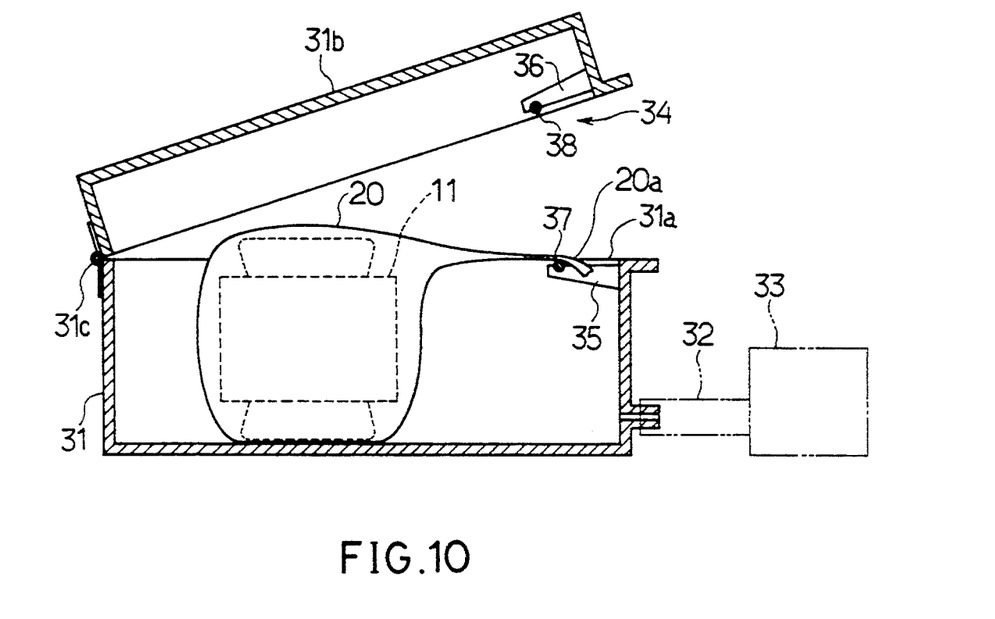
FIG. 10 is a longitudinally sectional view of the tank accommodating the winding assembly, in accordance with a fifth embodiment of the invention.
Figure 11:
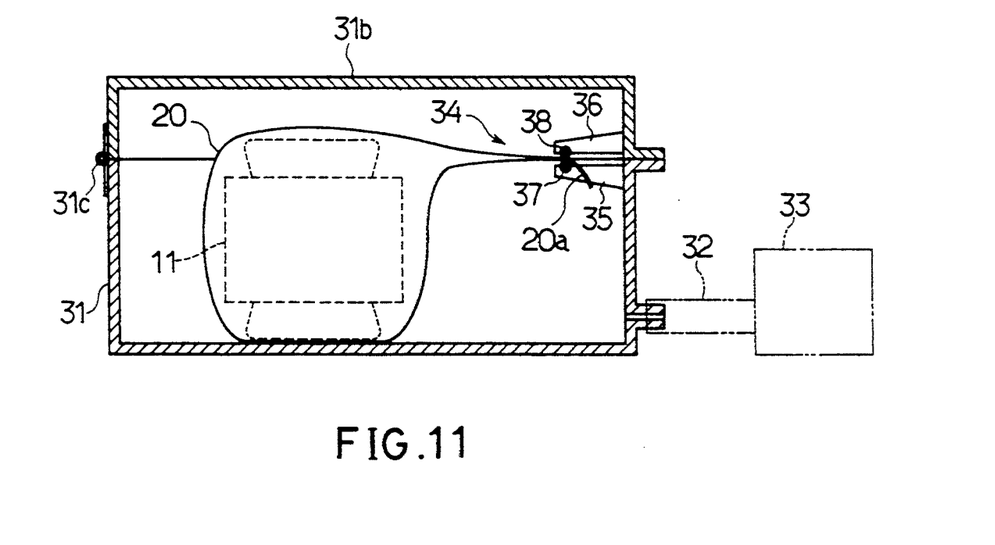
FIG. 11 is a longitudinally sectional view of the tank in the condition that the preparation for making a vacuum in the tank has been made.
Figure 12:
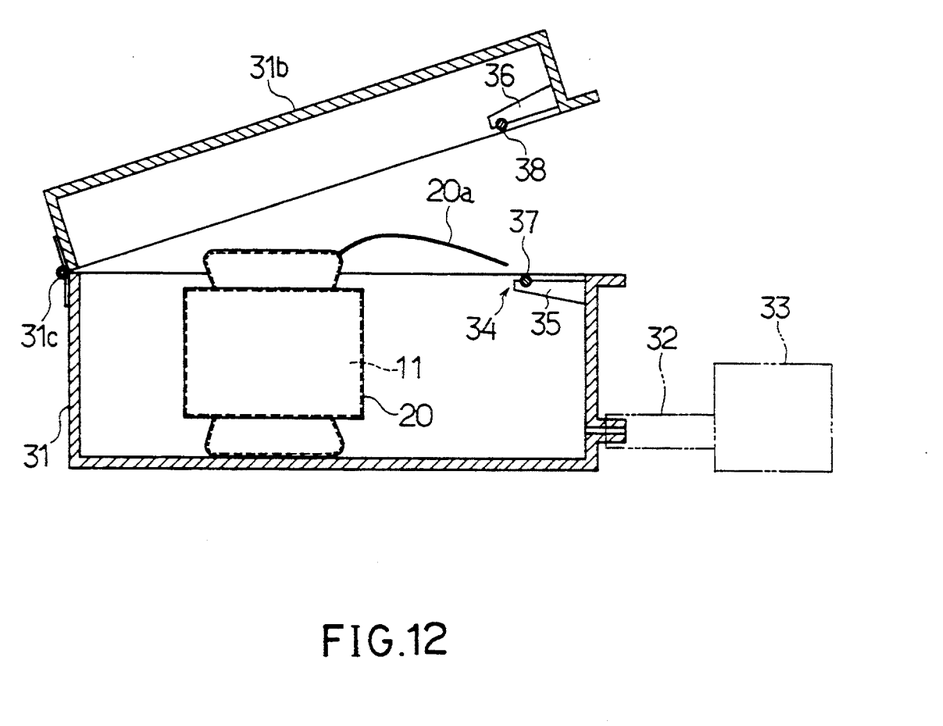
FIG. 12 is a longitudinally sectional view of the tank opened to an atmosphere after the vacuum.

FIGS. 10 through 12 illustrate a fifth embodiment of the invention. The lid 31b is mounted on the hinge 31c to open and close the upper opening 31a of the tank 31. The tank 31 is connected at its suitable portion to evacuating means such as a vacuum pump 33 through an air passage. The heat sealer 34 serving as bag closing means comprises a pair of heater supports 35, 36 secured to a portion of the tank 31 and a corresponding portion of the lid 31b respectively and heaters 37, 38 mounted on the respective heater supports 35, 36. The stator 11 as the winding assembly is enclosed in the bag 20 together with the predetermined amount of varnish 21 in the same manner as shown in FIG. 2. The bag 20 is then accommodated in the tank 31 whose lid 31b is opened such that the interior of the tank 31 is at the atmospheric pressure, as is shown in FIG. 10. The lid 31b is then closed such that the tank 31 is air-tightly closed, as shown in FIG. 11. In the condition that the tank 31 is air-tightly closed, the open end 20a of the bag 20 is held between the heaters 37, 38 of the heat sealer 34 but not yet sealed. Accordingly, air is allowed to flow into the bag 20 through the open end 20a. The vacuum pump 33 is then driven so that the tank 31 is evacuated. Since gas in the bag 20 is discharged into the tank 31 through its open end 20a during the evacuation of the tank 31, the bag 20 is also evacuated.

In the condition that the tank 31 has been evacuated, both of the heaters 37, 38 of the heat sealer 34 are energized to generate heat, thereby air-tightly sealing the open end 20a of the bag 20. Subsequently, the lid 30b is opened so that the atmospheric pressure is recovered in the tank 31. As shown in FIG. 12, the bag 20 is subjected to the atmospheric pressure such that the bag 20 is caused to closely adhere to the inner and outer circumferential faces of the stator 11, since the interior of the bag 20 is maintained in a vacuum. Consequently, the varnish 21 penetrates into the windings 13 and the slots 12a, thereby impregnating the stator 11 with the varnish 21. The stator 11 thus impregnated with the varnish 21 is transferred to the drying step performed in the same manner as described above. In this embodiment, the injection of the varnish 21 into the bag 20 may be performed in the tank by provision of a suitable injector on the tank 31.

The winding assembly may be impregnated with the varnish in the following method: a plurality of the bags 20 each enclosing one stator 11 are accommodated in the air-tightly closed tank as in the condition as shown in FIG. 2. The tank is evacuated by the pressure reducing device so that all the bags 20 are evacuated at once. The open ends 20a of the bags 20 are sealed and the varnish is injected into each of the bags 20.

Although the thermosetting varnish is employed in the foregoing embodiments, the varnish may be of the type subjected to an ultraviolet radiation or the type hardened in an anaerobic condition. furthermore, although the invention has been applied to the stator of the dynamoelectric machine in the foregoing embodiments, the invention can be applied to substantially all the electrical equipments.

The foregoing disclosure and drawings are merely illustrative of the principles of the present invention and are not to be interpreted in a limiting sense. The only limitation is to be determined from the scope of the appended claims.

I claim:

1. A method of impregnating a winding assembly of an electrical equipment with varnish, the winding assembly including a core and one or more windings wound on the core, the method comprising the steps of:
   a) enclosing the winding assembly in a flexible bag;
   b) pouring an amount of varnish sufficient to impregnate the winding assembly into the bag enclosing the winding assembly;
   c) reducing an atmospheric pressure in the bag and thereafter, maintaining the bag in the air-tightly closed state so that the bag closely surrounds the winding assembly and the winding of the winding assembly is impregnated with the varnish poured into the bag; and
   d) drying the winding assembly after completion of the step of impregnating the winding the varnish.

2. The method according to claim 1, wherein the drying step includes drying the winding assembly for a period of time in the condition that the winding assembly is enclosed in the bag and drying the winding assembly for another period of time in the condition that the winding assembly has been taken out of the bag.

3. The method according to claim 1, wherein the winding assembly has a generally cylindrical shape and the bag has an open and a closed end, the bag being folded at the middle portion thereof so that the closed end thereof passes through the inside of the cylindrical winding assembly to be thereby positioned at the open end side of the bag.

4. The method according to claim 1, wherein the winding assembly has a generally cylindrical shape and an inner circumferential portion is covered by an impermeable barrier.

5. The method according to claim 1, wherein the drying step includes heating the winding assembly enclosed in the bag in the state that the winding assembly is pressurized by a fluid from the outside of the bag.

6. A method of impregnating a winding assembly of an electrical equipment with varnish, the winding assembly including a core and one or more windings wound on the core, the method comprising the steps of:
   a) enclosing the winding assembly in a flexible bag;
   b) reducing the atmospheric pressure in the bag and thereafter, maintaining the bag in the air-tightly closed state;
   c) pouring an amount of varnish sufficient to impregnate the winding assembly into the bag under the pressure reduced state so that the bag closely surrounds the winding assembly and the winding of the winding assembly is impregnated with the varnish; and
   d) drying the winding assembly after completion of the step of impregnating the winding with the varnish.

7. The method according to claim 6, wherein the drying step including drying the winding assembly for a period of time in the condition that the winding assembly is enclosed in the bag and drying the winding assembly for another period of time in the condition that the winding assembly has been taken out of the bag.

8. The method according to claim 6, wherein the winding assembly has a generally cylindrical shape and the bag has an open and a closed end, the bag being folded at the middle portion thereof so that the closed end thereof passes through the inside of the cylindrical winding assembly to be thereby positioned at the open end side of the bag.

9. The method according to claim 6, wherein the winding assembly has a generally cylindrical shape and an inner circumferential portion is covered by an impermeable barrier.

10. The method according to claim 6, wherein an air-tightly closing member comprising an elastic material is attached to the bag, the varnish is poured into the bag with a jig, the air-tightly closing member allows the jig to be inserted into a portion of the bag so that air tightness of the portion of the bag is provided by elastic deformation of the air-tightly closing member.

11. The method according to claim 6, wherein the drying step includes heating the winding assembly enclosed in the bag in the state that the winding assembly is pressurized by a fluid from the outside of the bag.

12. A method of impregnating a winding assembly of an electrical equipment with varnish, the winding assembly including a core and one or more windings wound on the core, the method comprising the steps of:
   a) enclosing the winding assembly in a flexible bag having an open end with an amount of varnish sufficient to impregnate the winding assembly and thereafter, disposing the bag enclosing the winding assembly and the varnish in a tank opened to an atmosphere;
   b) air-tightly closing the tank in the condition that the open end of the bag remains open and reducing the atmospheric pressure in the tank so that the bag closely surrounds the winding assembly and the atmospheric pressure in the bag is reduced;
   c) air-tightly closing the opening of the bag in the state that the atmospheric pressure in the tank is reduced;
   d) increasing the atmospheric pressure in the tank to an about ambient pressure after completion of the step of air-tightly closing the open end of the bag; and
   e) drying the winding assembly after completion of the step of increasing the atmospheric pressure in the tank to about ambient pressure.

13. A method of impregnating a winding assembly of an electrical equipment with varnish, the winding assembly including a core and one or more windings wound on the core, the method comprising the steps of:
   a) enclosing the winding assembly in a flexible bag having an open end and thereafter, disposing the bag enclosing the winding assembly in a tank opened to an atmosphere;
   b) air-tightly closing the tank in the condition that the open end of the bag remains open and reducing the atmospheric pressure in the tank so that the atmospheric pressure in the bag is reduced and the bag closely surrounds the winding assembly;
   c) pouring an amount of varnish sufficient to impregnate the winding assembly into the bag either before or after the tank is air-tightly closed;
   d) air-tightly closing the open end of the bag in the state that the atmospheric pressure in the tank is reduced;
   e) increasing the pressure in the tank to an approximately about ambient pressure after completion of the step of air-tightly closing the open end of the bag; and
   f) drying the winding assembly after completion of the step of increasing the atmospheric pressure in the tank to about ambient pressure.

* * * * *